United States Patent [19]

Orlowski

[11] 3,982,035
[45] Sept. 21, 1976

[54] MOLDING APPARATUS AND METHOD
[76] Inventor: Gerald J. Orlowski, 7545 Ponderosa Court, Orland Park, Ill. 60462
[22] Filed: Sept. 20, 1974
[21] Appl. No.: 507,701

[52] U.S. Cl. .............................. 426/454; 17/32; 425/261; 425/448
[51] Int. Cl.² ........................................ A23G 3/00
[58] Field of Search ........................ 425/238–239, 425/240, 241, 261, 448; 17/32; 164/363; 100/223; 264/109, 330, 219, 334; 426/512, 513, 454

[56] References Cited
UNITED STATES PATENTS

| | | | |
|---|---|---|---|
| 2,203,518 | 6/1940 | Bauer | 17/32 |
| 2,651,430 | 9/1953 | Garfunkel | 17/32 |
| 3,452,389 | 7/1969 | Felstehausen | 17/32 |
| 3,461,483 | 8/1969 | Felstehausen | 425/89 |
| 3,633,245 | 1/1972 | Partos | 17/32 |

Primary Examiner—Francis S. Husar
Assistant Examiner—Robert J. Charvat
Attorney, Agent, or Firm—Lockwood, Dewey, Zickert & Alex

[57] ABSTRACT

An apparatus and method for forming uniform patties from a mass of agglomerable edible material. The apparatus includes a supporting frame, drive means for operating the apparatus, a hopper, and a rotatable turret including a plurality of cavities radially aligned therein. Each cavity has a barrier means mounted for reciprocal movement therein including a working surface which together with a portion of the cavity forms a mold. Means in said hopper moves material therethrough and into each mold as it is rotated on the turret to a position in communication with the hopper. The patty is formed as the turret continues rotation and then the mold moves out of communication with the hopper. The barrier means reciprocates in the cavity and discharges the patty therefrom while maintaining its shape as formed. The barrier means is removable and may be combined with a stationary core for changing the shape of the mold.

19 Claims, 19 Drawing Figures

MOLDING APPARATUS AND METHOD

This invention relates to apparatus and method for molding an agglomerable material. More particularly, this invention relates to a molding apparatus which is capable of dividing an agglomerable mass of edible material into uniform patties or portions convenient for further preparation and eventual individual consumption.

A need has arisen in the food processing industry for improved apparatus capable of molding finely divided edible material into convenient individual servings such as ground meat, vegetable, or like patties. Present equipment available to the food processor is large, cumbersome, mechanically complicated, noisy in operation, laborious to clean, and limited in rate of patty output. Recent federal laws establish limitations on the allowable noise levels of industrial apparatus operation. Also, present food processing apparatus is limited in the shape of patty which may be formed on a mass production basis. Machines of this type are primarily designed for making hamburger patties. While other agglomerable materials such as chopped vegetables, poultry, etc. may be fed through present machines, the patties made therein are generally limited to a structure having a continuously filled interior.

Applicant's invention resolves industrial noise problems and other maladies associated with more complex machinery by being uncomplicated in structure, having fewer movable parts, and being easier and quicker to clean and overhaul than existing patty making machinery. The invention expands present limitations regarding mass production output by being based on a simple turret provided with any number of radially aligned molds which number may be increased in larger embodiments of the invention for producing a higher article per minute output without increasing the rotational speed of the turret. Also, this invention resolves shape limitations inherent in present food processing machinery by providing molds which produce patties having hollow portions therein and capable of simultaneously producing more than one patty per mold. The patties formed in the apparatus of the invention are also discharged from the molds in a gentle manner which precludes their deformation.

Applicant's invention is an apparatus and method for forming a plurality of uniformly shaped patties from a mass of agglomerable material. The apparatus includes means for molding the material into a desired shaped patty including a rotatable turret having a plurality of tubular cavities extending axially through the turret and positioned in spaced circular and radial relation from its center. Molds are positioned in a portion of each cavity. The invention also includes a hopper positioned adjacent the turret with a discharge portion of the hopper contiguous with turret mold openings during a portion of its rotation, means for urging agglomerable material into each mold, filling same, and separating that material from the greater mass of material in the hopper. Each cavity also includes therein a reciprocating patty discharge means including a removable piston having a bottom face which forms a surface of the mold. The piston is reciprocated in the cavity after the patty of agglomerable material is urged into and formed in the mold to discharge the material therefrom in a gentle manner precluding its deformation during the discharge. The piston is easily replaceable allowing differing shape pistons and stationary cores which matingly engage same to be inserted in the cavity thereby providing a variety of mold shapes heretofore unobtainable in patty making machines.

It is therefore an object of the invention to provide an apparatus and method for molding a plurality of individual patties from a mass of agglomerable material.

Another object of the invention is the provision of an apparatus for forming edible food patties which is quieter and simpler in construction than heretofore known edible food patty making machinery.

A further object of the invention is the provision of a molding apparatus having a plurality of cavities therein with each cavity having a reciprocating barrier means therein for discharging patties formed in a mold located in a portion of each cavity.

A still further object of the invention is the provision of a molding apparatus which is capable of molding food patties which are hollow in form.

An important object of the invention is the provision of a molding apparatus having means capable of discharging a food patty having hollow portions therein without distorting its shape.

Other objects, features, and advantages of the invention will be apparent from the following detailed disclosure, taken in conjunction with the accompanying sheets of drawings, wherein like reference numerals refer to like parts, in which.

Figures 1, 2:
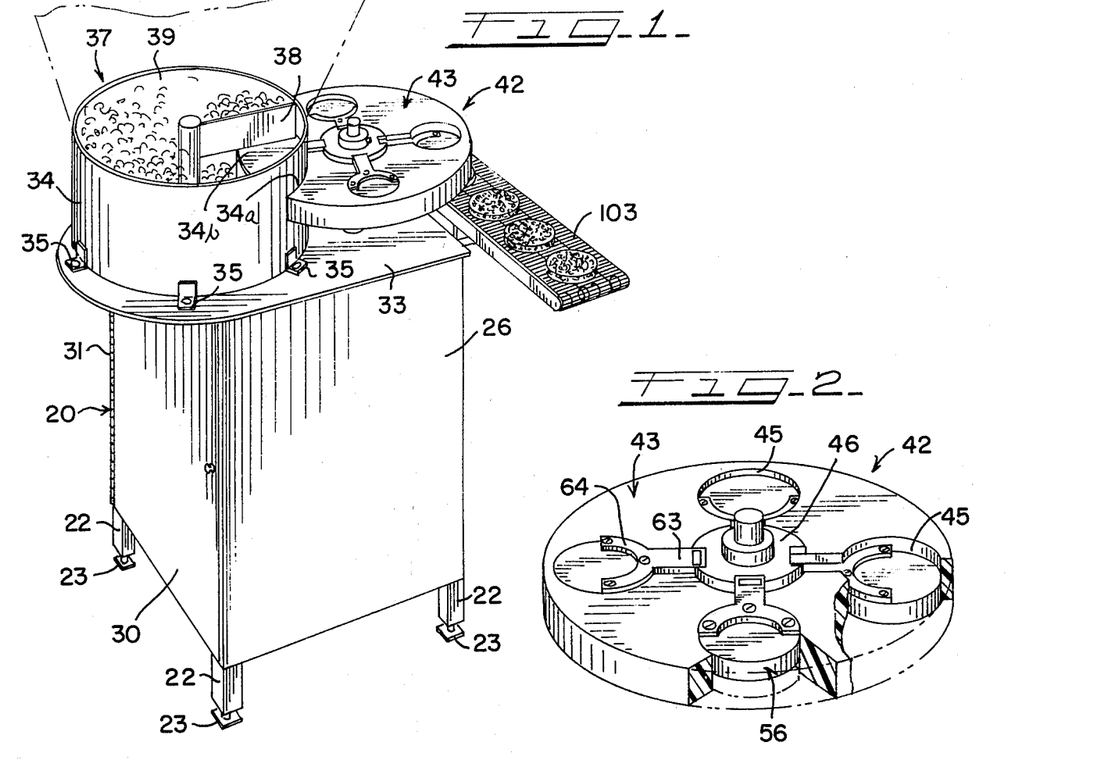
FIG. 1 is a perspective view of the molding apparatus of the invention.
FIG. 2 is a close-up detailed perspective view of the rotatable turret partially cut-away showing the relative positions of the reciprocating barrier means in each cavity.
Figure 3:
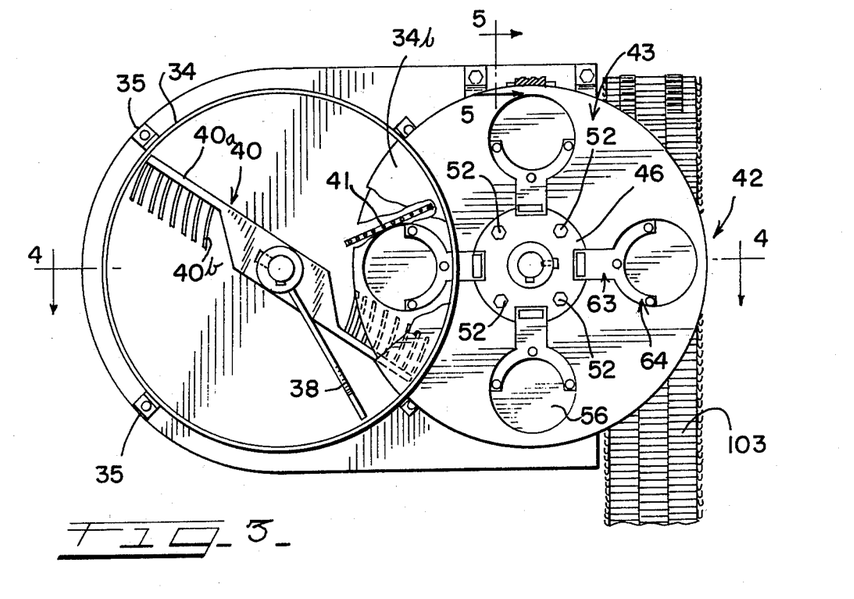
FIG. 3 is a top plan view of the molding apparatus of the invention showing the interrelation between the hopper and turret.

In FIG. 1, the molding apparatus of the invention is shown generally at 20. It includes a supporting framework, generally at 21, having side vertical support rails 22 at each corner thereof as shown most clearly in FIG. 4 with the bottom portion of the rails having conventional adjustable leg supports 23 which allow leveling of the apparatus upon a floor. Frame 21 also includes horizontal side rails 24 which connect the vertical side rails 22 providing for a rigid framework. A housing 26 extends around the outside of frame support 21, is mounted thereto, and may include a door 30 conventionally hinged to the frame at 31 which allows access to the drive mechanism mounted inside the frame. The apparatus is, to a large extent, made of stainless steel for compliance with codes applying to food processing machinery. A top cover 33 is mounted horizontally on the top of frame support 21 and provides a working surface for the apparatus generally.

A large hollow generally cylindrical sleeve 34 is removably attached to the working surface of top cover 33 by conventional clip means 35 for ease of cleaning and together with the top cover forms a hopper, generally at 37, into which a mass of agglomerate material 39 such as ground beef, veal, other meat and poultry, or chopped vegetables having a suitable binding material added thereto, are placed in order to be fed into the molding means of the apparatus.

A rotatable first exterior drive shaft 36 is centrally positioned inside the hopper cylindrical sleeve 34 and extends upward from the top cover. A churning arm 38 is connected to drive shaft 36, rotates conjointly therewith, and extends horizontally from the drive shaft to the inside surface of sleeve 34 near the top thereof. Arm 38 assures constant movement of agglomerate material 39 placed in the hopper 37. A material urging means or combed paddle 40 includes a plurality of braces 40a having a plurality of tines 40b extending at an aligned downward incline therefrom. Paddle 40 is mounted to rotate on drive shaft 36 and together with stationary comb 41 mounted on top cover 33 forces agglomerate material into the mold means, shown generally at 42, positioned contiguously to the urging means 40 during a portion of each revolution. It can be understood the differing urging means 40 such as a solid paddle or the like may achieve substantially the same result within the scope of the invention.

Mold means 42 includes a disc shape turret 43 which is drivably connected to a second exterior drive shaft 44 that also extends upward through top cover 33. Turret 43 is preferably made of nylon although other materials may be satisfactory. In the first embodiment, turret 43 includes four generally circular cylindrical cavities 45 located in evenly spaced angular and radial relation to an axially aligned central mounting aperture 46 through which second exterior drive shaft 44 is mounted. It can be appreciated that the cavities 45 can be other than circular in cross section as viewed perpendicularly to their axis. The cavity cross-sectional shape may determine the patty outline.

Figure 6:
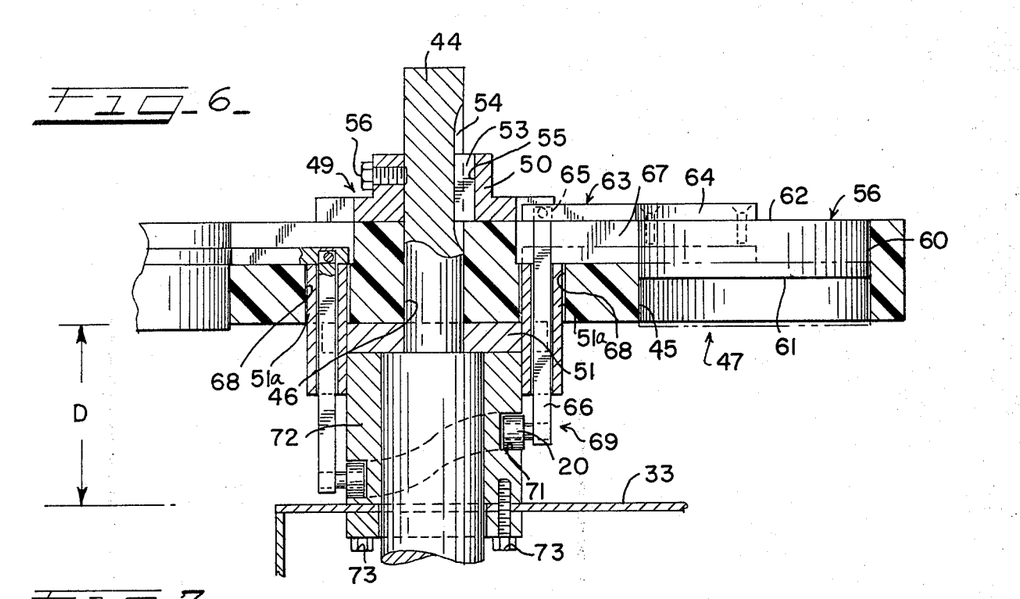
FIG. 6 is an enlarged detail sectional view of the rotatable turret shown in FIG. 4.

In order to maintain turret 43 in fixed position relative the second drive shaft 44, a two-piece mounting hub, generally 49, including a top retaining flanged collar 50 and a bottom sleeve mounting 51 are shown most clearly in FIG. 6. The flanged collar 50 and sleeve mounting 51 are positioned on either side of the turret 43 outwardly adjacent and centrally aligned with the central turret mounting aperture 46. A plurality of mounting bolts 52 extend through the top collar, the carriage, and into the bottom sleeve mounting in evenly spaced orientation around the drive shaft mounting aperture, thereby retaining the hub 49 solidly to the turret. The turret 43 is then mounted to drive shaft 44 by a key 53 located in keyways 54 and 55 in the shaft and collar, respectively. Other mounting means such as a spline or a set screw 56 mounted through the top collar and impinging on drive shaft 44 may also be used.

Figure 16:
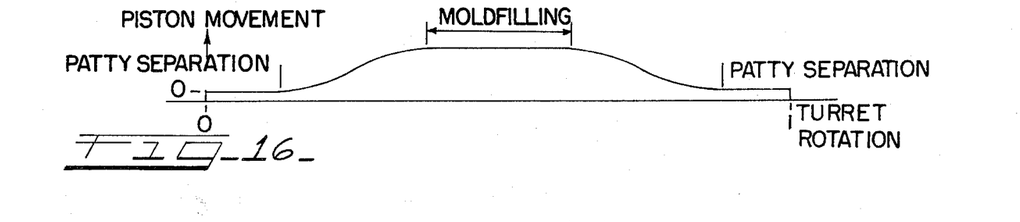
FIG. 16 is a displacement diagram for the cam operated reciprocating barrier means.

Each cavity 45 has a piston barrier means 56 positioned in axial alignment therein for reciprocating motion. Each piston 56 has a side wall 60 which slidingly engages the side wall of the cavity 45 providing an engagement therebetween capable of preventing movement of agglomerate material between the walls. Each piston also includes a bottom face 61 which may be flat or convoluted and which forms the top wall of the mold 47. Bottom face 61 and the portion of cavity 45 below it form the mold 47. The bottom face 61 is preferably coated with low friction material such as sold under the trademark Teflon. Each piston also has a top wall 62 to which a connecting bar 63 is attached. In this embodiment, the attachment is made at a C-shape end 64 which gives the total bar a sling shot appearance. Bar 63 reciprocates vertically in a recess 67 in turret 43 inwardly adjacent mold cavity 45. The bar is suitably removably attached at 65 to a cam follower rod 66 which is vertically reciprocably retained in a sleeve 51a forming a portion of the bottom sleeve mounting 51 and extending through turret 43 at aperture 68. At the bottom end of cam follower rod 66 a conventional roller cam follower 70 is threadedly mounted at right angles to the rod 66. A cylindrical spacer sleeve 72 is positioned around the second exterior drive shaft 44 and elevates the turret 43 from the top cover 33. A cam groove or channel 71 is indented in the side of spacer sleeve 72 and extends therearound. Cam follower 70 rides on the bottom surface of groove 71. Spacer sleeve 72 is rigidly mounted to top cover 33 by bolts 73 or the like. A displacement curve for the cam and the piston is shown in FIG. 16 and indicates that each piston 56 reciprocates in its cavity 45 once during each revolution of turret 43. Connecting bar 63, cam follower rod 66, cam follower 70 and cam groove 71 are hereafter collectively referrred to as cam positioning means 69.

To interrelate the turret 43 and hopper 37, first turret 43 is mounted on second exterior drive shaft 44 in spaced relation to top cover 33. Cylindrical sleeve 34 is then positioned around first drive shaft 36 and moved to a location concentric therewith by positioning a portion of turret 43 through a horizontal rectangular slotted hole 34a in the side of sleeve 34. Hole 34a is situated near the middle of the side of sleeve 34 such that the sleeve rests on top cover 33 as the turret is inserted in the slot. The portion of turret 43 which is inserted in hole 34a is substantial in that a mold with its axis located on a line between drive shafts 36, 44, is completely inside hopper 37. The distance D by which turret 43 is elevated from top cover 33 is sufficient to allow material urging means 40 rotating in hopper 37 to pass contiguously under the bottom opening in mold 45 and thereby push agglomerate material 39 into it as it rotates. Churning arm 38 is placed in spatial relation with the urging means 40 in a position where it churns agglomerated mass 39 located above the portion of turret 43 which is inserted through the slit hold 34a. A plate 34b is positioned inwardly adjacent the top edge of hole 34a so as to cover the top and side of the portion of turret 43 inserted in the hole 34a. Plate 34b keeps agglomerable material from portions of the turret 43 other than its bottom surface and mold opening. Churning arm 38 sweeps clear the top of plate 34b preventing agglomerated material from stagnating on top of the plate. It can be understood that the shape of hopper 37 may be changed to eliminate the need for a churning arm.

Figures 4, 5:
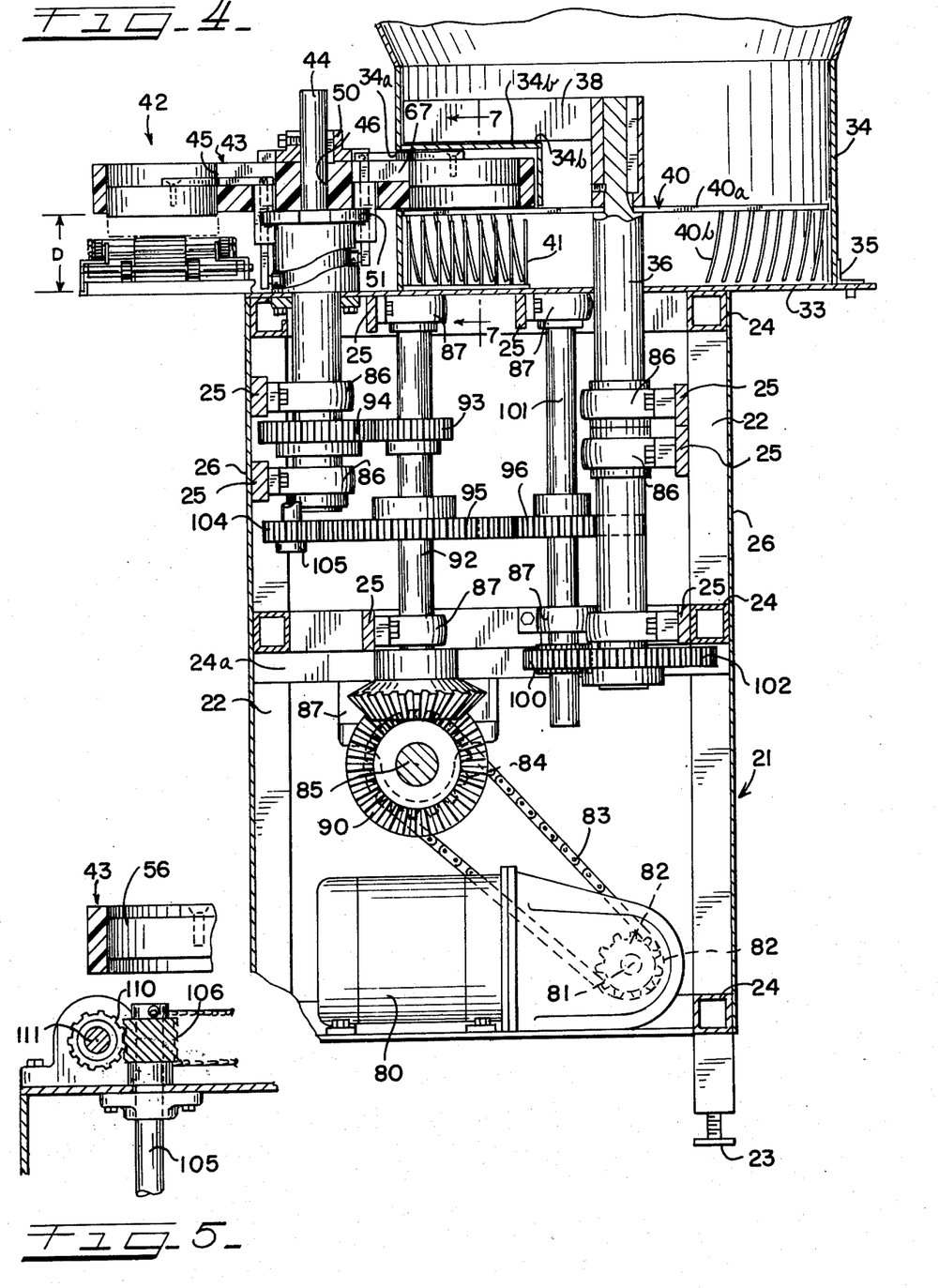
FIG. 4 is a partial vertical cross-sectional view taken substantially along line 4—4 of FIG. 3.
FIG. 5 is a partial cross-sectional view taken substantially along like 5—5 of FIG. 3.

The drive means which is located in the frame support 21 is shown most clearly in FIG. 4. The drive means includes a prime mover, such as an electric motor 80, which is rigidly mounted to the bottom frame support 21. The output shaft 81 of the electric motor is connected to a sprocket 82 which drives chain 83. It should be noted that preferably chain 83 moves in a vertical plane. A driven sprocket 84 connected to the chain is mounted on a first interior drive shaft 85 which is horizontally oriented and suitably rotatably mounted to an additional horizontal frame member 24a through pillow blocks 87, only one of which is shown. In this embodiment all rotating shafts are maintained in position by a pair of pillow blocks 86, 87, depending upon the shaft's diameter. A plurality of horizontal cross members 25 fixedly mounted to frame members 22, 24 are also utilized to mount pillow blocks 86, 86. All gears and sprockets in the drive train are suitably fixedly mounted to their respective drive shafts such as by key means or the like.

A bevel gear 90 connected to first interior drive shaft 85 drives a mating bevel gear 91 on second interior drive shaft 92. Shaft 92 is mounted in vertical orientation and rotating power from it drives the second exterior drive shaft 44 through spur gear 93 on shaft 92 and spur gear 94 on shaft 44. A suitable speed reduction through sprockets, bevel gears, and spur gears determines the speed of second external drive shaft 44. First external drive shaft 36 is driven from spur gear 95 on shaft 92 through spur gears 96 and 100 mounted on third interior drive shaft 101 which is also mounted to the frame 21 in vertical orientation. Gear 100 is meshed with spur gear 102 mounted on first exterior drive shaft 36. A suitable gear reduction is obtained through that chain of spur gears providing first exterior drive shaft 36 with a rotating speed which is a multiple of rotations higher than second external drive shaft 44, preferably two or four times the speed of shaft 44. The relative speed of rotation of urging means 40 and turret 43 are dictated by the number of paddles provided on urging means 40 and the number of molds 47 in each turret 43. A paddle on urging means 40 preferably should be swept across the opening of each mold 47 at least once to urge agglomerable material into the mold and divide it from the greater mass 39 in the hopper 37. However, the rotational speed of urging means 40 and churning arm 38 should not be so fast as to separate the natural juices from the materials 39 placed into the hopper. It can be understood that other drive mechanisms utilizing drive means differing from those employed in this embodiment may be utilized to accomplish substantially the same result within the scope of the invention.

In many cases, a purchaser of a patty molding apparatus will desire that it be placed adjacent a conveyor belt supplied by the purchaser. However, a conveyor belt 103 may be added to the molding apparatus 20 and positioned underneath a portion of turret 43 substantially diagonally opposite that portion inserted in hopper slot 34a. Conveyor belt 103 is driven by spur gear 95 on shaft 92 which meshes with spur gear 104 on a third exterior drive shaft 105 shown partially in FIG. 4 and in detail in FIG. 5. A helical gear 106 on the upper end of shaft 105 meshes with helical gear 110 on conveyor belt drive shaft 111. Conveyor belt 103 may be a type conventionally used in the food processing industry.

Figure 7:
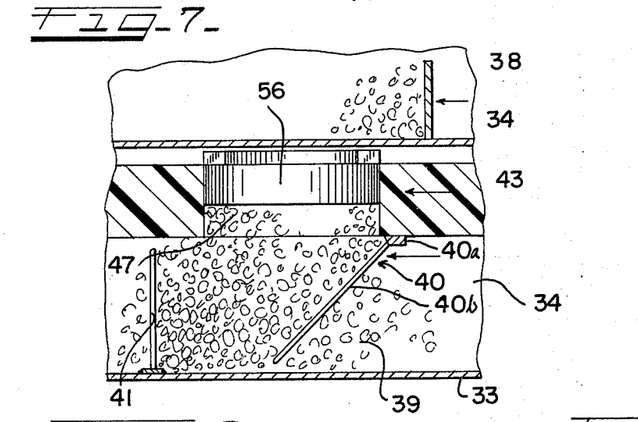
FIG. 7 is a detail cross-sectional view taken along line 7—7 of FIG. 4.
Figure 8:
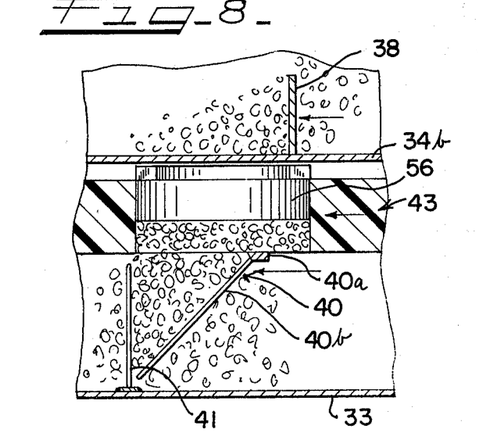
FIG. 8 is a detail cross-sectional view similar to FIG. 7 wherein the means for urging agglomerated edible material into the mold is further advanced than in FIG. 7.
Figure 9:
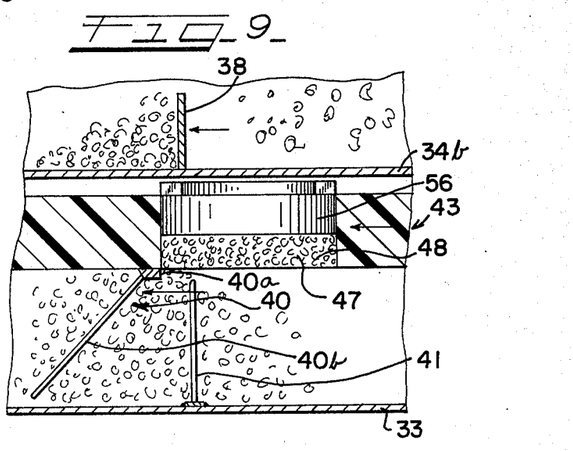
FIG. 9 is a partial cross-sectional view similar to FIG. 8 wherein the mold has been completely filled with agglomerated edible material by the urging means.

The integrated operation of the apparatus for forming a patty in a mold including hopper 37, churning arm 38, and urging means 40, together with the rotating turret 43 is shown in FIGS. 7, 8, and 9. In FIG. 7, a mold 47 rotates with turret 43 and as it enters the interior of hopper 37 through slot 34a, the reciprocating piston barrier means 56 reaches the full upward position in cavity 45 dictated by the cam positioning means 69. In its position in side hopper 37, the mold 47 formed inside cavity 45 has its opening at the bottom of turret 43 in communication with the mass of agglomerable material 39 in the hopper. When the opening in mold 47 is in communication with material 39 in hopper 37, paddle 40 rotates under the mold and together with stationary comb 41 urges agglomerable material 39 located between the two upwardly into the mold 47. It can be understood that if a solid paddle urging means is utilized, stationary comb 41 is eliminated. In FIG. 8, paddle 40 has moved across a portion of the opening of mold 47 packing the material 39 therein and its brace 40a is dividing the agglomerable material and forming the bottom surface of the patty 48 made therefrom. As comb paddle 40 sweeps across the underside of mold 47 the leading edge of the paddle tines 40b begins passing through stationary comb 41. This scissor action pushes material upward and packs it into the mold 47 assuring the filling thereof. However, material may also escape between the tines of each comb. Therefore, the spacing of the tines 40b is one way of determining the consistency of the end product patty 48. Also, it should be noted that churning arm 38 is at the same time moving across the cover plate 34b sweeping agglomerable material from the cover to prevent stagnation and to move the material into a position replacing that agglomerable material divided from the mass 39 and positioned in the mold 47.

In FIG. 9, urging comb paddle 40 has passed the opening of rotating mold 47 and completely divided the patty 48 formed therein from the greater agglomerable mass 39 in the hopper 37. The paddle has also completely passed through stationary comb 41. Piston 56 then remains in an upward position until the patty 48 in the mold 47 exits the hopper 37 through slot 34a and revolvingly moves toward a carriage patty discharging position which is substantially diagonally opposite the patty filling position inside the hopper.

Figure 10:
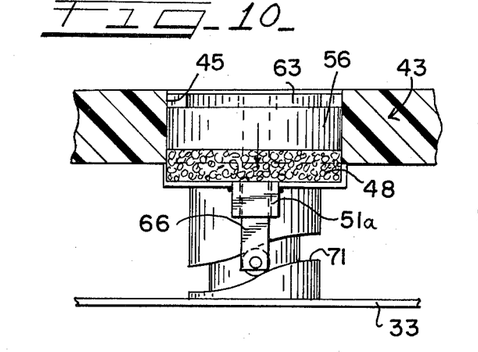
FIG. 10 is a detail cross-sectional view similar to FIG. 7 showing the discharging means pushing a patty from the cavity as the mold collapses.
Figure 11:
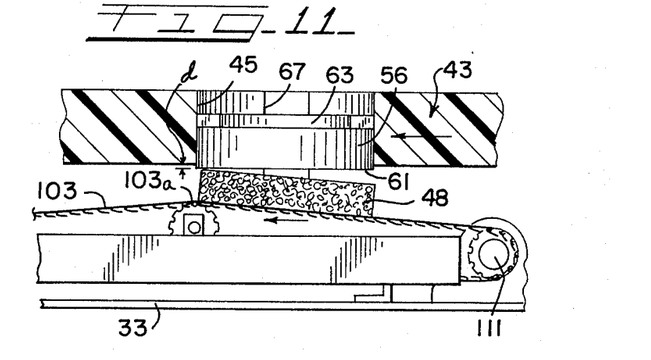
FIG. 11 is a partial cross-sectional view similar to FIG. 10 showing the discharge means positioning a patty on a conveyor belt.

In operation, the discharge of a disc shape patty 48 is shown in FIGS. 10 and 11. FIG. 10 shows the piston 56 located in the cavity side wall 45 reciprocated midway between full upward position and full downward position as it appears when the mold 47 is rotated midway between the patty forming and patty discharging locations. As shown in FIG. 16, the up and down displacement of the piston 56 by the cam positioning means 69 is smooth and continuous in changing slope and the upper and lower portions of travel are flat, thus providing a gentle discharge of each patty 48. As shown in FIGS. 10 and 11, patty 48 maintains its shape as it is being discharged from mold 47. In FIG. 11, piston 56 has reached a full downward reciprocating position in cavity 45 such that the bottom face 61 of the piston is actually extended a distance d spatially below the bottom surface of the turret 43 completely collapsing the mold area 47. In this position, only surface tension between the patty 48 and bottom face 61 keeps the patty in communication with the piston. Conveyor belt 103 is moved at an incline as it travels adjacent piston 56 when it is in a full downward orientation. As the leading edge of patty 48 touches the conveyor belt at its apex, 104a, that surface tension is overcome and the patty falls onto belt 103 where it is moved to another location. Then, piston 56 reciprocates upwardly into the cavity 45 and the added distance d between the top of patty 48 and the bottom of turret 43 assures that movement of the patty relative the turret will leave each patty in an undisturbed shape.

Figure 12:
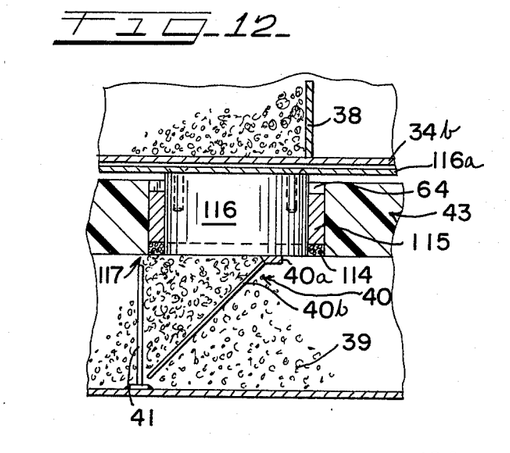
FIG. 12 is a partial cross-sectional view of the mold cavity similar to FIG. 8 wherein the reciprocating cylindrical piston has been replaced with a second embodiment including an annular barrier means and a stationary core suitable for forming an annular patty.
Figure 13:
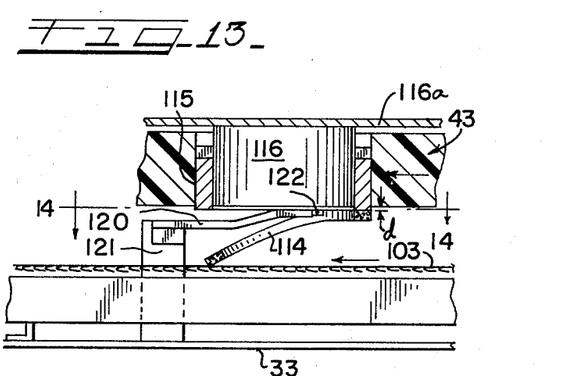
FIG. 13 is a partial cross-sectional view similar to FIG. 12 wherein the reciprocating annular barrier means is discharging an annular patty with the aid of a knife edge mounted adjacent a discharge conveyor belt.

FIGS. 12 and 13 show the formation and discharge of a patty 114 having a hollow portion therein, in this modification patty 114 is annular in shape. In FIG. 12 modified piston 115 is annular in shape and connecting rod 63 with C-shaped end 64 may again be utilized to retain the piston. It should be noted a connecting rod of differing shape may be necessary if the patty shape is changed, or if a plurality of molds are formed in one cavity. A core 116 of cylindrical outline matingly fits into the hole inside annular piston 115 thus forming an inner sidewall of the annular mold. Core 116 is retained in position by being mounted to plate 116a which removably and rigidly fits on top of turret 43. It can be appreciated that cores and pistons may be of differing shapes and that more than one piston may be utilized in each mold cavity 45 as long as the core or cores fill the remainder of the cavity excluding the mold area. An infinite variety of patty shapes and sizes may be formed in this manner.

For instance, if a patty is desired which has a smaller outline than that of cavity 45, then the piston is made the shape of the desired patty, and the core fills the remainder of the cavity surrounding the piston, thus forming the outer sidewall of the mold. In this manner, an insertable core may form both the inner and outer walls of a mold. Therefore, the size and/or shape of each mold may be changed as desired up the the size as the original cavity 45.

An example of more than one mold being utilized in a cavity is the formation of small annular onion rings. Two or more annular pistons having a total outline fitting into cavity 45 are mounted to the connecting rod, and a core filling the remainder of the cavity is inserted therein. Such a core would define both the inner and outer mold sidewalls, and a plurality of small onion rings would be formed in one cavity with each rotation of the turret. Annular patty 114 is formed in the same manner as disc shape patty 48. As combed paddle 40 sweeps across the opening of the abbreviated mold, generally at 117, agglomerated material 39 is pressed therein and more excess agglomerable material passes through the tines 40b of the paddle as the core 116 fills a greater portion of the original cavity than in the first embodiment. Combed paddle 40 then sweeps across the entire opening of mold 117, as previously described in the first embodiment, and divides the agglomerable material urged therein into an annular patty 114.

Figure 14:
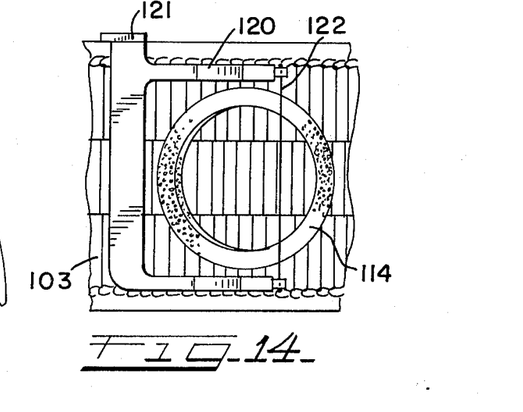
FIG. 14 is a partial cross-sectional view taken along line 14—14 of FIG. 13.

In FIGS. 13 and 14 the discharge of annular patty 114 is assisted by a C-shape member 120, securely mounted to base 121 which in turn is mounted to top cover 33. The C-shape member 120 includes a wire knife edge 122 which extends across the mouth of the C which is an area traversed by the bottom surface of piston 115. As piston 115 reaches its fully downward reciprocating position, wire knife edge 122 breaks the surface tension between patty 114 and piston 115 allowing it to be positioned on conveyor belt 103 without distorting its annular shape. Annular shaped patty 114 is preferably adapted for use when utilizing chopped onion particles agglomerated utilizing elgin gum based binder or the like. The cutting edge 122, particularly in wire form, creates no drag upon the patty which would deform its shape while severing it from the piston.

Figure 15:
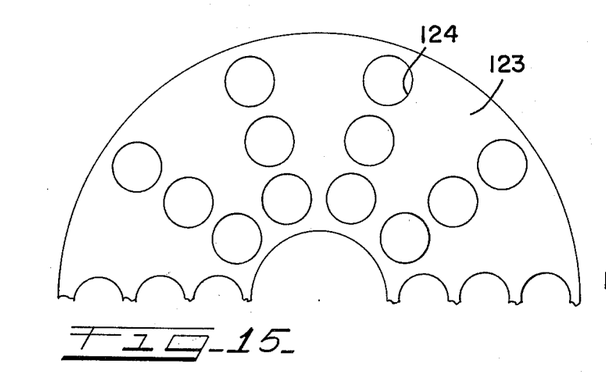
FIG. 15 shows a diagrammatic plan view of a modification of the turret.

FIG. 15 shows a second embodiment of a turret 123 which contains a greater plurality of cavities 124 than does turret 43. This greater number of cavities provides for a greater production output without increasing the rotating speed of the turret. It can be understood that other portions of the apparatus would have to be enlarged, some in size and some in number, to provide the same relative movement between portions of the apparatus as described in the first embodiment. However, this type of multiple cavity orientation on the turret provides a greater output in patties produced per minute than heretofore known patty molding apparatus.

The apparatus of the invention may also be utilized for molding patties made of combinations of differing agglomerable materials, such as vegetables and meat. In particular, widely varying percentages of soybean meal are combinable with ground meat for producing patties in the apparatus.

It will be understood that modifications and variations may be effected without departing from the scope of the novel concepts of the present invention, but it is understood that this application is limited only by the scope of the appended claims.

I claim:

1. A method forming a patty from a mass of agglomerable material comprising the steps of:

feeding agglomerable material into a hopper;

moving said material through said hopper and substantially upwardly into a mold position in communication with said hopper until said mold is filled with said material thereby forming a patty, said mold being located in a cavity and a plurality of said cavities being positioned in spaced radial relation around the center of a rotating turret, and a lower portion of each cavity, a working bottom face on a barrier means reciprocably mounted therein, and a mold bottom opening forming the surfaces of each mold, moving said mold out of communication with said hopper by continued rotation of said turret, reciprocating said barrier means through said cavity to collapse said mold and discharge said patty substantially downwardly therefrom through said mold bottom, and separating said patty from said barrier means while maintaining the shape of the patty as formed by passing the interface of said patty and said barrier means across a wire cut-off means.

2. Apparatus for forming a plurality of uniformly shaped patties from a mass of agglomerable edible material comprising:
a frame,
a drive means retained on said frame,
a hopper attached to said frame for receiving a mass of agglomerable edible material,
a turret rotatably mounted to said frame and drivingly connected to said drive means including a plurality of cavities located in spaced angular and radial relation therearound, each cavity having a barrier means mounted for reciprocal movement axially therein, each said barrier means having a bottom surface coacting with a cavity to form a mold,
means in said hopper for moving agglomerable edible material through said hopper and substantially upwardly into said mold, filling it, and forming a patty therein as each mold opening is positioned in communication with said hopper during a portion of each turret rotation, and
means coacting with the turret reciprocating said barrier means through said cavity as said turret rotates to push a patty substantially downwardly out therefrom at a portion of rotation externally of said hopper,
and means connected to the frame for separating a patty from said barrier means in a manner preventing its deformation during separation.

3. The apparatus called for in claim 2 wherein said barrier means includes
at least one piston positioned in slidable engagement with the side walls of said cavity, said piston including a working bottom face which forms at least a partial surface of said mold.

4. The apparatus called for in claim 3 wherein each said cavity further includes
a core removably rigidly mounted therein and partially filling same for changing at least one of; the sidewalls of said mold, the size of each mold, the shape of each mold, and the number of molds in said cavity.

5. The apparatus called for in claim 3 wherein
said turret and said cavities therein are vertically axially aligned,
a cycle of piston reciprocal movement is one turret rotation, and
said mold is formed below said bottom face and is positioned to be filled with agglomerable material along a portion of said turret rotation where each reciprocating piston is at its highest position.

6. The apparatus called for in claim 5 wherein said means for patty-piston separation is suitable for disc shaped patties and includes
a conveyor located spatially subadjacent said turret along a portion of said rotation where each piston is at its lowest position, said conveyor having an inclining path of travel immediately under said turret capable of providing a leading edge contact between a patty extending downward from said piston bottom face and the conveyor for overcoming the surface tension between same causing their separation.

7. The apparatus called for in claim 5 wherein said means for patty-piston separation includes
knife edge positioned contiguously across the lowest position on the path of travel of said bottom face.

8. The apparatus called for in claim 7 wherein said knife edge includes
a wire connected between the distal ends of a bifurcated bracket on said frame.

9. In an apparatus for forming a plurality of uniformly shaped patties from a mass of agglomerable edible material such as chopped meat, poultry, fish, vegetables and the like together with binder means, said apparatus including
a supporting frame,
drive means mounted thereon,
a hopper attached to said frame capable of receiving a mass of agglomerable edible material,
a turret centrally mounted to said frame for rotation in vertical axial orientation and drivingly connected to said drive means including a plurality of axially aligned molds located in spaced radial relation therearound, a bottom opening in each mold being positioned in communication with said hopper during a segment of each turret rotation,
and means said hopper for moving agglomerable edible material substantially upwardly into said mold opening during said segment of turret rotation,
the improvement comprising
a plurality of barrier means removably positioned in said turret for a vertical reciprocal cycle of movement therein during each turret rotation, a working bottom face of each barrier means forming a portion of a mold surface, each barrier means being positioned in its cycle to allow the formation of a patty in each mold during said segment of turret rotation, and each barrier means being reciprocated during the remainder of said turret rotation to collapse the mold and substantially downwardly discharge a patty formed therein while maintaining its shape as formed.

10. The apparatus recited in claim 9 and means connected to the frame for overcoming surface tension between a patty and said barrier means working bottom face.

11. In the apparatus recited in claim 10 wherein said means for overcoming surface tension includes
a conveyor means positioned in sufficient spatial relation below said turret for allowing angular edge first contact between a patty being discharged therefrom and said conveyor.

12. In the apparatus recited in claim 10 wherein said means for overcoming surface tension includes
a knife edge contiguously positioned across the path of travel of said barrier means at the junction of said barrier means and a patty attached thereto during a portion of said turret rotation when said barrier means is located in a most downwardly extended patty discharge position.

13. In the apparatus recited in claim 9 and a cavity forming an extension from said mold, said barrier means being mounted for co-axial reciprocal movement in said cavity and a working surface of said barrier means forming a top portion of said mold.

14. In the apparatus recited in claim 13 wherein a cross-sectional area of said barrier means substantially conforms to the cross-sectional area of said cavity.

15. In the apparatus recited in claim 13 wherein cross-sectional area of said barrier means plus a cross-section area of a stationary core removably mounted in said cavity substantially conform to the cross-sectional area of said cavity.

16. The apparatus called for in claim 3 wherein each said cavity further includes
a core rigidly and removably mounted therein and partially filling same for changing the shape of each mold.

17. The apparatus called for in claim 3 wherein each said cavity further includes
a core rigidly and removably mounted therein and partially filling same for changing the shape of each mold.

18. The apparatus called for in claim 3 wherein each said cavity further includes
a core rigidly and removably mounted therein and partially filling same for changing the number of molds in said cavity.

19. A machine for forming patties from a mass of flowable material, said machine comprising a casing for containing such a material, said casing having a side entrance, a support movably mounted in relation to said casing and provided with a plurality of molds for successive entry into said casing through said entrance, means in said casing for urging material upwardly into and completely filling each mold to form a patty therein during the period the mold is in the casing, each of said molds comprising an opening provided in the support and a piston movable in each opening, means for elevating each piston to increase the size of the mold during the period it is being filled, and means for moving each piston downwardly to eject each patty directly after it leaves said casing.

* * * * *

UNITED STATES PATENT AND TRADEMARK OFFICE
CERTIFICATE OF CORRECTION

PATENT NO. : 3,982,035
DATED : September 21, 1976
INVENTOR(S) : Gerald J. Orlowski It is certified that error appears in the above-identified patent and that said Letters Patent are hereby corrected as shown below:

Column 11, Line 4, "shape" should be --size--.

Signed and Sealed this

Fourth Day of January 1977

[SEAL]

Attest:

RUTH C. MASON
*Attesting Officer*

C. MARSHALL DANN
*Commissioner of Patents and Trademarks*